United States Patent
Johnson

(10) Patent No.: US 11,976,971 B2
(45) Date of Patent: May 7, 2024

(54) SPECTROGRAPH RECYCLING

(71) Applicant: Michigan Aerospace Corporation, Ann Arbor, MI (US)

(72) Inventor: Will Johnson, Saline, MI (US)

(73) Assignee: MICHIGAN AEROSPACE CORPORATION, Ypsilanti, MI (US)

( * ) Notice: Subject to any disclaimer, the term of this patent is extended or adjusted under 35 U.S.C. 154(b) by 517 days.

(21) Appl. No.: 17/272,667

(22) PCT Filed: Sep. 4, 2019

(86) PCT No.: PCT/US2019/049461
§ 371 (c)(1),
(2) Date: Mar. 2, 2021

(87) PCT Pub. No.: WO2020/051185
PCT Pub. Date: Mar. 12, 2020

(65) Prior Publication Data
US 2021/0341334 A1    Nov. 4, 2021

Related U.S. Application Data

(60) Provisional application No. 62/726,561, filed on Sep. 4, 2018.

(51) Int. Cl.
*G01J 3/02* (2006.01)
*F21V 8/00* (2006.01)
(Continued)

(52) U.S. Cl.
CPC ............ *G01J 3/0221* (2013.01); *G01J 3/18* (2013.01); *G01J 3/2803* (2013.01); *G01S 17/95* (2013.01);
(Continued)

(58) Field of Classification Search
None
See application file for complete search history.

(56) References Cited

U.S. PATENT DOCUMENTS

2013/0169959 A1*  7/2013  Guenther ............... G01J 3/027
                                                                    356/326
2015/0034591 A1   2/2015  Vink et al.

FOREIGN PATENT DOCUMENTS

| | | |
|---|---|---|
| GB | 2362460 A | 11/2001 |
| KR | 101683465 B1 | 12/2016 |
| WO | 2011117565 A2 | 9/2011 |

OTHER PUBLICATIONS

PCT International Search Report and Written Opinion dated Dec. 2, 2019 in counterpart PCT application PCT/US19/49461, 8 pages.
(Continued)

*Primary Examiner* — Edwin C Gunberg
(74) *Attorney, Agent, or Firm* — Juan Carlos A. Marquez; Marquez IP Law Office, PLLC

(57) ABSTRACT

Spectrographic measurements are often limited by the amount of light that is available. Photons that are not collected or measured reduce the signal to noise and therefore reduce measurement precision. This invention collects the zero order light and sends it through the spectrometer again. In an atmospheric LIDAR, the zero order recycling is estimated to increase the rotational Raman signal by an additional 20%. A grating based spectrometer where the zero order light is collected by a lens or mirror and focused into a fiber optic that sends the light to the input slit where it is directed into the spectrometer again. There can be a plurality of recycle fibers. The detector can be either a single linear array or a two dimensional array such as a CCD or CMOS camera.

6 Claims, 4 Drawing Sheets

(51) Int. Cl.
*G01J 3/18* (2006.01)
*G01J 3/28* (2006.01)
*G01S 17/95* (2006.01)
(52) U.S. Cl.
CPC .... *G02B 6/0008* (2013.01); *G01J 2003/2813* (2013.01)

(56) References Cited

OTHER PUBLICATIONS

PCT International Preliminary Report on Patentability dated Mar. 9, 2021 in counterpart PCT application PCT/US2019/049461, 5 pages.

* cited by examiner

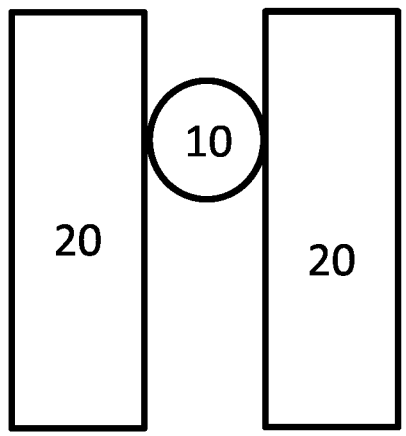
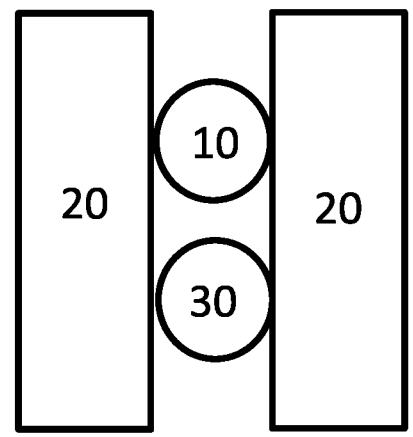
FIGURE 3 A
FIGURE 3 B

SPECTROGRAPH RECYCLING

I. BACKGROUND OF INVENTION

A. Scope of the Invention

This invention uses or recycles the zero order light from a diffraction grating based spectrograph. Estimates of the improvement made in the performance of a spectrograph so configured indicate that the output signal could be increased by 20 percent.

B. Summary of the Prior Art

Spectrographic measurements are often limited by the amount of light that is available. Photons that are not collected or measured reduce the signal to noise, and therefore reduce measurement precision. In current spectrographs, the zero order light is not used even though it is a significant portion of the incoming light. Typically, the zero order light is absorbed to reduce the potential for the zero order light scattering and contaminating the diffracted light that one wishes to measure.

II. SUMMARY OF THE INVENTION

Spectrographic measurements are often limited by the amount of light that is available. Photons that are not collected or measured reduce the signal to noise and therefore reduce measurement precision. This invention collects the zero order light and sends it through the spectrometer again. In an atmospheric LIDAR, the zero order recycling is estimated to increase the rotational Raman signal by an additional 20%. The present invention is directed to providing and implementing a grating-based spectrometer where the zero order light is collected by a lens or mirror and focused into a fiber optic that sends the light to the input slit where it is re-directed back into the spectrometer.

III. BRIEF DESCRIPTION OF THE DRAWINGS

The present invention is illustrated in the accompanying drawings, wherein:

FIG. 3A shows the arrangement of the input fiber and the spectrometer slit according to the present invention;

FIG. 3B shows the arrangement of the input and recycle fiber and the spectrometer slit according to the present invention;

IV. DESCRIPTION OF THE PREFERRED EMBODIMENT

Figure 1:
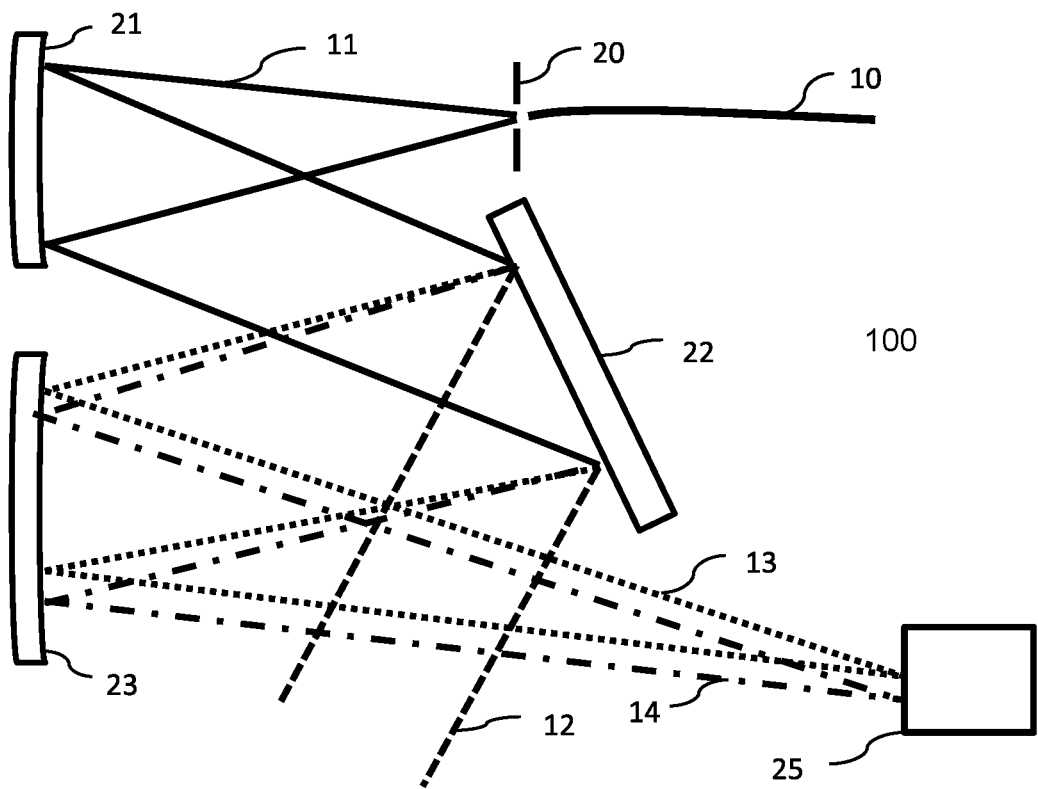
FIG. 1 illustrates a diffraction grating spectrometer that shows the zero order light that is not usually shown as known in the prior art.

The embodiments of the present invention will be described hereinbelow in conjunction with the above-described drawings. FIG. 1 shows a prior art spectrograph system that uses reflective optics and diffraction grating. In the general operation of the system, light is input to the spectrometer 100 via a fiber optic 10 through a slit 20 and onto a first mirror 21. The first mirror 21 collimates the light from the fiber 10 and directs the light to the grating 22. Light that strikes the grating is reflected into the zero order 12 as well as the order to which the grating is designed to reflect the maximum energy for a given wavelength.

The light diffracted by the grating 22 is captured by a focusing mirror 23 and an image of the input fiber for a wavelength is reconstructed on the detectors 25. The diffracted light 13 and 14 for the first wavelength 13 and second wavelength 14 is collected by the focusing mirror 23 and focused on the detector array 25. In FIG. 1, the light from the zero order is shown going off into space. In the prior art designs, that light is lost.

Figure 2:
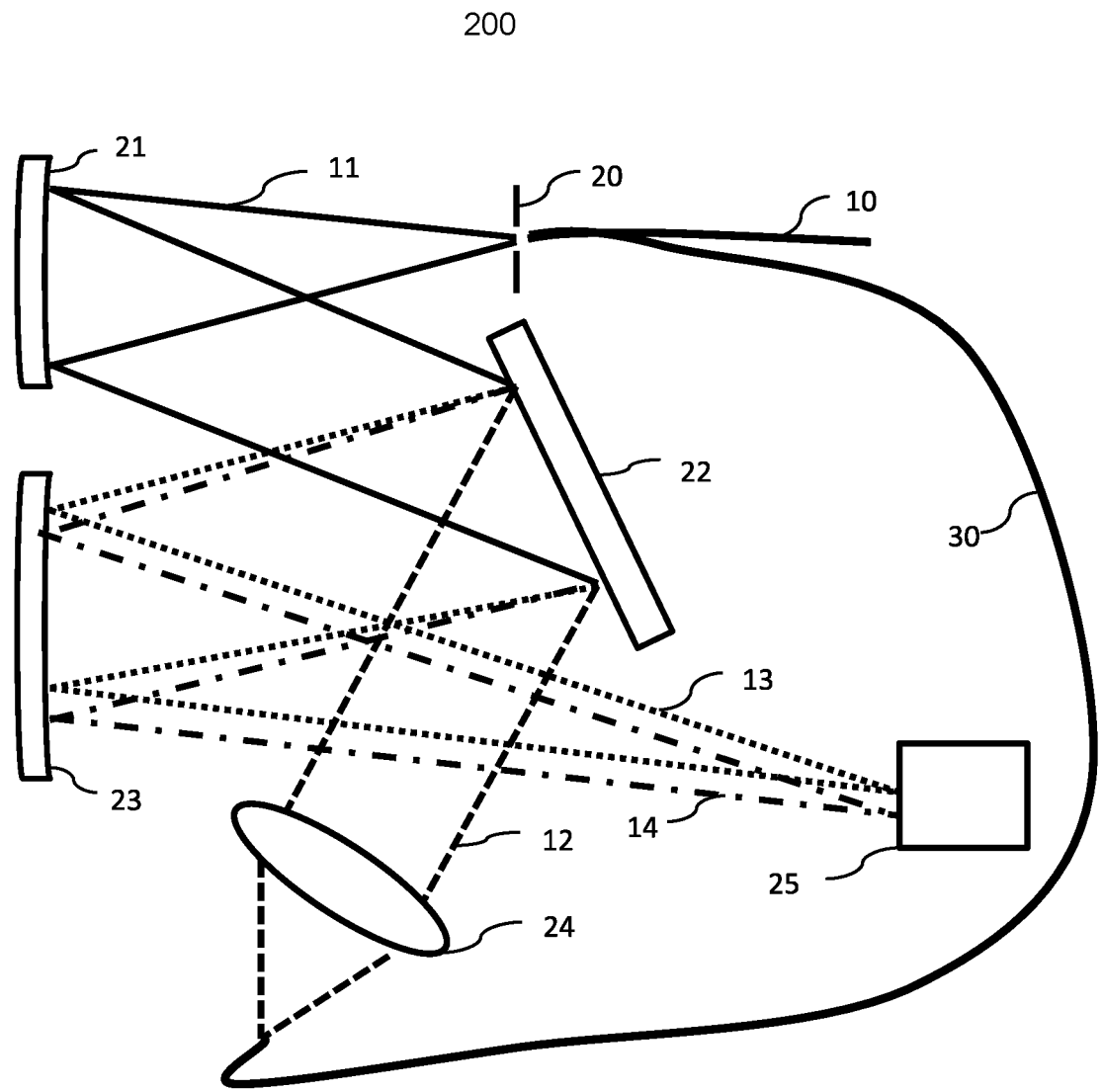
FIG. 2 shows a lens capturing the zero order and coupling the light into an optical fiber according to the present invention.

In a spectrometer 200 according to the present invention, as shown in FIG. 2, the zero order light is captured by a focusing element 24, in this embodiment a lens, that focuses the zero order light 12 into the recycle fiber optic 30 that then re-directs the captured zero order light back to the input slit 20 of the spectrometer 200. In another embodiment, the focusing element 24 may be implemented as a mirror (not shown), a combination thereof, or any other device known in the art having similar functionality to capture and focus the zero order light.

FIG. 3A shows the relationship between the input fiber 10 and the slit 20 according to the prior art. FIG. 3B shows how the recycle fiber 30 is arranged below the input fiber 10 and relative to the slit 20 according to the present invention. Although this embodiment illustrates the input fiber 10 above the recycle fiber 30, the order could be switched without impacting the operation of the system.

Figure 4:
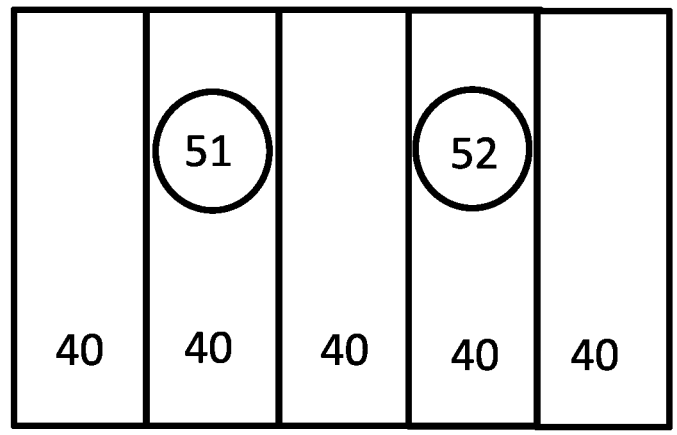
FIG. 4A shows the fiber image on a portion of the detector array for the input light according to the present invention.
FIG. 4B shows the fiber image of the input and recycle fiber on a portion of the detector array for two wavelengths of light according to the present invention.
Figure 4:
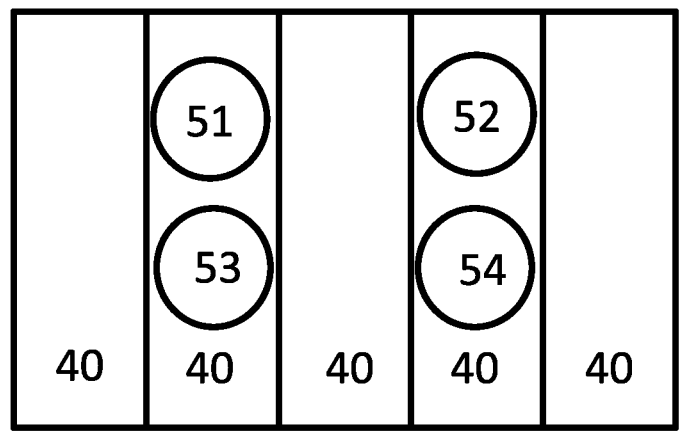

FIG. 4A shows how the diffracted light at a first wavelength 13 and at a second wavelength 14 are imaged on the elements 40 of the detector array 25 (see FIG. 2). In at least one embodiment, the detector array 25 may be implemented as a single linear photodetector array or a two-dimensional array such as a CCD or CMOS camera. The image of the first wavelength 51 and the image of the second wavelength 52 are shown on the detector elements 40. In practice, the images 51 and 52 may be larger or smaller that the examples used in the drawings. FIG. 4B shows how the recycled zero order light 12 is focused on the detector elements 40. The image of the first wavelength 51 and the image of the second wavelength 52 are shown along with a first wavelength recycle image 53 and a second wavelength recycle image 54.

The detector elements 40 are shown to be rectangular in this embodiment, but could be square, circular or any other arrangement known in the art. In this embodiment, the detector array 25 is implemented as an array of photomultipliers that have a rectangular active area. Other geometries for a detector array or other photodetectors with similar functionalities as known in the art could also be used.

It should be noted that, in the examples illustrated in FIGS. 4A and 4B, the images of the first wavelength 51 and second wavelength 52 are shown as circles that are aligned with the detector elements 40. That is not a necessary requirement and in actual practice, the images will be spread over multiple detector elements 40.

While the preferred embodiment uses a single recycle, there may be cases where additional recycle fibers could be added to the system to gain additional signal. As such, the recycle fiber optic 30 may be implemented as a single recycle fiber, a plurality of recycle fibers, or any other device known in the art having similar functionality transmit the zero order light from the focusing element 24 back to the input slit 20. The limiting factor in the number of recycle fibers is the height of the input slit 20. Each recycle fiber occupies a portion of the slit 20 and the recycle fibers could over fill the slit with the result of overfilling the slit and causing a loss in inputted light energy.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

I claim:

1. A grating based spectrometer, comprising:
    an input optic fiber;
    a recycling optic fiber;
    a grating;
    a first focusing mirror;
    a detector; and
    a collimating mirror positioned to collimate light from the input optic fiber and direct the light to the grating, wherein a portion of the light striking the grating is reflected into at least a zero order,
    the light diffracted by the grating is captured by the first focusing mirror,
    first and second diffracted light from the grating are collected by the first focusing mirror and focused on the detector, and
    the zero order light is collected and focused into recycling optic fiber that sends the zero order light back to the collimating mirror so as to be directed again into the spectrometer.

2. A grating based spectrometer according to claim 1, further comprising:
    a plurality of recycling optic fibers.

3. A grating based spectrometer according to claim 1, wherein the detector is at least one of a single linear array and a two dimensional array.

4. A grating based spectrometer according to claim 3, wherein the detector is at least one of a CCD and CMOS camera.

5. A grating based spectrometer according to claim 1, further comprising:
    A focusing element operatively positioned to collect and focus the zero order light into the recycling optic fiber.

6. A grating based spectrometer according to claim 3, wherein the focusing element is at least one of a lens and second focusing mirror.

* * * * *